United States Patent [19]

Jossic

[11] 3,809,960
[45] May 7, 1974

[54] HEATING INDICATING DEVICE OF AN ELECTRIC MOTOR

[75] Inventor: Alain Francois Jossic, Belfort, France

[73] Assignee: Societe Honeywell Bull., Paris, France

[22] Filed: Mar. 6, 1973

[21] Appl. No.: 338,491

[30] Foreign Application Priority Data
Mar. 13, 1972 France .............................. 72.08659

[52] U.S. Cl. ........... 317/13 B, 317/13 R, 317/40 R, 318/471
[51] Int. Cl. ............................................. H02h 7/08
[58] Field of Search ........ 317/13 R, 13 B, 40 R, 31, 317/36 TD; 318/471, 473

[56] References Cited
UNITED STATES PATENTS
3,735,219  5/1973  Kahn ................................ 317/13 R
3,643,130  2/1972  Liska ............................... 317/40 R
3,721,880  3/1973  Neill ................................ 317/13 B Primary Examiner—J. D. Miller
Assistant Examiner—Pat Salce
Attorney, Agent, or Firm—William F. White; Ronald T. Reiling

[57] ABSTRACT

Heating indicating device for the rotor of an electric motor notably using direct current.

According to the invention, this device is characterized in that it comprises a resistor mounted in series with said rotor, means reading the voltage across said resistor and supplying an output voltage corresponding to the square of the input voltage, means simulating the thermal exchange time constant between said rotor and its environment and causing progression, in time, of said output voltage in accordance with said time constant, means for emitting a reference voltage representative of the maximum allowable temperature that must not be exceeded for the rotor and means for comparing this reference voltage and the output voltage of the means simulating the time constant.

Supervision of motor, notably in printing machines.

10 Claims, 3 Drawing Figures

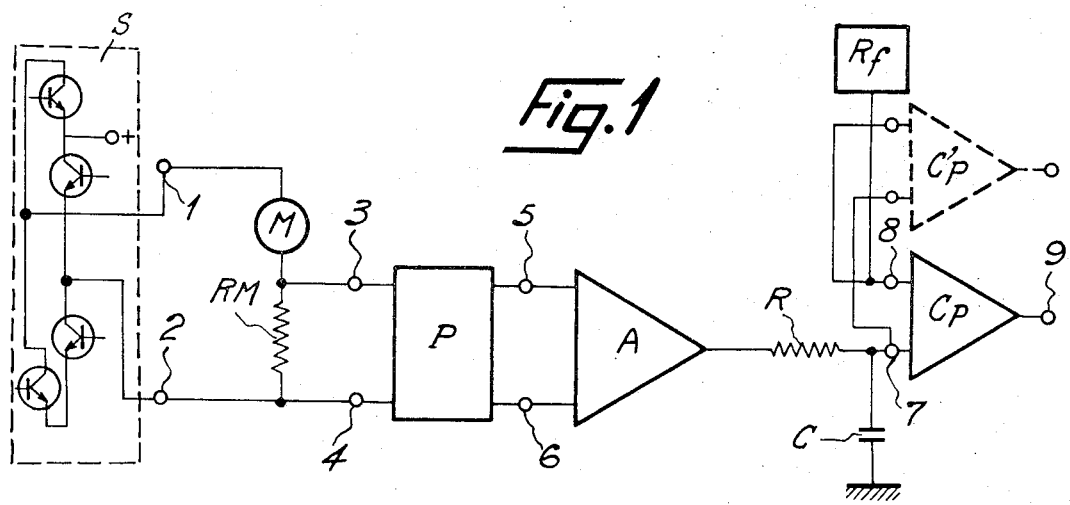

HEATING INDICATING DEVICE OF AN ELECTRIC MOTOR

BACKGROUND OF THE INVENTION

The present invention concerns a heating indicating device for the rotor of an electric motor. It is well known that in operating, the rotor of a motor heats up under the effect of the current which goes through it. If the instantaneous heating of this rotor is too great, there can result deformations of this rotor which can cause deterioration and even destruction of said motor. This is especially true for direct current motors whose rotor is formed by a printed circuit.

It is therefore important to know the heating of the rotor motor which is in operation, in order to limit its performance, if necessary, and consequently, its temperature. In fact, the power dissipated in the rotor depends directly on the work supplied by the motor.

The ideal solution would consist in directly measuring the temperature of the rotor. However, it is impossible to do this by simple means and inexpensively.

In conformity with the invention, instantaneous heating of the rotor is simulated outside of the motor by utilizing the intensity which goes through the rotor.

THE INVENTION

According to the invention, the heating indicating device of the motor rotor is remarkable in that it comprises a resistor connected in series with said rotor, means for reading the voltage across said resistor and supplying an output voltage corresponding to the square of the input voltage, means simulating the time constant for thermic exchange between said rotor and its environment and causing progression, in time, of said output voltage in accordance with said time constant, means for emitting a reference voltage representative of the temperature which must not be exceeded for the rotor and means for comparing the reference voltage and output voltage of the means simulating the time constant.

The voltage across said resistor is proportial to the current flowing through said rotor. The square of this voltage is thus proportional to the power dissipated in the rotor by the Joule effect and to the instantaneous heating of this rotor. Consequently, the voltage output supplied by the time constant means represents the instantaneous temperature of the rotor.

According to the results of this comparison between the voltage appearing at the output of the time constant means and the reference voltage, the comparison means can start up or stop a fan, limit motor performance activate an alarm device, etc . . .

The device, according to the invention, is particularly advantageous in printing machines where the movement of the print support in front of the print hammers is due to the action of a direct current motor. It then enables, if required, limitation of the frequency of repetition of the paper slews.

The means providing an output voltage corresponding to the square of the voltage at their input can be formed a simple multiplier of known type. These means can also be formed by a voltage divider bridge comprising a varistor.

An amplifier can be inserted between said means and those simulating the rotor time constant. These latter means can be made up of a network RC. The values of this network are computed so that this constant RC is equal to the real thermal exchange time constant between the rotor and its environment, constant which has been previously measured in a known fashion. Thus, a CEM-PARVEX direct current motor of type F 12 N4HA comprising a printed circuit rotor, ventilated at a rate of 5 litres of air per second, has a time constant of 15s.

The means for emitting the reference voltage can be arranged so that this reference voltage decreases when the ambient temperature increases and vice versa, in order to take into account variations in the latter. This can be obtained in known fashion by a thermistor. For the case in which the motor is supplied by power transistors, the reference voltage is adjusted according to the ambient temperature, so that the highest temperature reached by said transistors remains constant.

The comparison means can be formed by a least one differential comparator of known type. Preferably, they comprise as many comparators of this type in parallel as there are operations to be executed when the temperature of the rotor reaches the limit which is not to be exceeded. Thus, one of these comparators can control the start-up of a fan, another the limitation of performance, etc . . .

The figures of the appended drawing clearly illustrate how the invention can be realized.

FIG. 1 is a schematic view of the device according to the invention.

FIG. 2 shows schematically a mode of execution for means which can supply a voltage corresponding to the square of the voltage across the resistor in series with the motor.

FIG. 3 shows a mode of execution for means supplying the reference voltage.

The device in conformity with the invention, shown in FIG. 1, comprises a resistor RM of known value, connected in series with the rotor of motor M. Resistor RM and the rotor are supplied by a supply S connected between supply terminals 1 and 2. This supply device S is, for example, a transistor bridge of known type such as is shown within the dotted block which is supplied by a direct voltage supply connected to the terminals of one of its diagonals, said rotor being mounted on the other diagonal of the bridge.

Voltage U at terminals 3 and 4 of resistor RM is transmitted to a device P which can deliver between its output terminals 5 and 6 a voltage which is the square of the voltage appearing between input terminals 3 and 4. Voltage $U^2$ appearing at terminals 5 and 6 is then amplified by amplifier A and applied to a RC network reconstituting the time constant characteristic of the thermal exchanges between the rotor of motor M and the environment of this rotor.

Thus, between output terminal 7 of RC network and the ground, there will appear a voltage proportional to the instantaneous temperature of the rotor of motor M. Output 7 is connected to one of the inputs of a comparator Cp whose other input 8 receives, from a device Rf, a reference voltage corresponding to the heating limit which is not to be exceeded for the rotor of motor M.

According to the polarity of the difference of the singals appearing on terminals 7 and 8, there will appear at output 9 of comparator Cp a signal indicating that the temperature of the rotor is greater or less than the maximum allowable temperature. This signal is capable of controlling any device appropriate for executing the desired operation. It will be noticed that it is possible to connect several comparators $Cp$, $Cp'$ ... in parallel, in order to assign each of them to a particular operation.

Device P can be a multiplier device of known type multiplying the voltage which it receives by itself. FIG. 2 shows an execution variant for device P comprising a varistor. It is well known that a varistor is a device which presents a characteristic such that the current $i$ which goes through it is of the form $i = K V^n$, in which $K$ is a factor of proportionality, $V$ the voltage across said varistor and $n$ a number greater than 1. A varistor 10 is selected for which $n = 2$ and it is connected in series with a resistor 11, of low value with respect to said varistor 10. It can thus be said that $i \approx K U^2$. Voltage U being proportional to the current I going through the rotor of the motor M, it is possible to write $U = K_1 \cdot I$.

Consequently, if $r$ is the value of resistor 11, the voltage $v$ between terminals 5 and 6 has as its value:
$$v = r \cdot i \approx K \cdot r \cdot U^2 = K_2 I^2$$
with $K_2 = K \cdot K_1^2 \cdot r$ The voltage between terminals 5 and 6 is thus proportional to the square of the current flowing through the rotor.

FIG. 3 shows a mode of execution for device $Rf$ emitting the reference voltage. This device comprises a transistor 12 of NPN type whose collector is connected to the $+e$ pole of a direct voltage supply. The base of transistor 12 is connected to the slide of a potentiometer 13 forming a voltage divider between the $+e$ pole and the ground $(-e)$, with resistors 14 and 15. The potential of point 16 common to resistor 15 (connected to the $+e$ pole) and to potentiometer 13 is stabilized by a Zener diode 17. The emitter of transistor 12 is connected to the ground by two resistors 18 and 19 in series, terminal 8 being connected to the point common to these resistors. A thermistor 20 is mounted in parallel on resistor 19 connected to the ground.

Thus, transistor 12 being conducting, the potential on terminal 8 is determined by divider bridge 18, 19 and 20. If the ambient temperature rises, the value of thermistor 20 decreases. The result is that the potential of terminal 8 decreases as well. The conduction of transistor 12 is regulated by the slide of potentiometer 13.

Preferably, when motor M is supplied via by a bridge of transistors, the voltage on terminal 8 is adjusted by thermistor 20, so that the maximum allowable temperature reached by these transistors remains constant.

I claim:

1. A heating indicating device for the rotor of an electric motor, characterized in that it comprises a resistor mounted in series with said rotor, first means for sensing the voltage across said resistor and supplying an output voltage corresponding to the square of said voltage across said resistor, second means for simulating the thermal exchange time constant between said rotor and its environment and for varying, in time, said output voltage in accordance with said time constant, third means for emitting a reference voltage representative of the maximum allowable temperature which must not be exceeded for the rotor and fourth means for comparing this reference voltage and the output voltage of the second means for simulating the time constant.

2. Device according to claim 1, characterized in that the first means for supplying an output voltage comprises a multiplier device.

3. Device according to claim 1, characterized in that the first means for supplying an output voltage comprises a divider bridge including a varistor whose current characteristic $i$ versus voltage V is of the form $i = K \cdot V^2$, where $K$ is a constant.

4. Device according to claim 1, characterized in that an amplifier circuit is inserted between the first means for supplying an output voltage and the second means for simulating the time constant of the rotor.

5. Device according to claim 1, characterized in that the second means for simulating the time constant of the rotor is formed by a network RC.

6. Device according to claim 1, characterized in that the third means for emitting the reference voltage includes fifth means for decreasing said reference voltage when the temperature of the air surrounding said electric motor increases and vice versa.

7. Device according to claim 6, in combination with power transistors supplying the motor, characterized in that the reference voltage is adjusted according to the temperature of the air surrounding said electric motors, so that maximum allowable temperature reached by said transistors remains constant.

8. Device according to claim 6, characterized in that said third means for emitting the reference voltage comprises a resistor bridge including at least one thermistor.

9. Device according to claim 8, characterized in that said resistor bridge is connected in series in the emitter-collector path of a transistor whose the base polarization voltage is variable.

10. Device according to claim 1, characterized in that said fourth comparison means comprises several comparators in parallel.

* * * * *